United States Patent [19]

Mattson et al.

[11] 4,356,373
[45] Oct. 26, 1982

[54] ELECTRICAL RESISTANCE WELDING APPARATUS

[75] Inventors: Karl E. Mattson, Näsum; Hass Bertil, Olofström, both of Sweden

[73] Assignee: AB Volvo, Gothenburg, Sweden

[21] Appl. No.: 190,870

[22] PCT Filed: Jul. 19, 1979

[86] PCT No.: PCT/SE79/00159
§ 371 Date: Mar. 21, 1980
§ 102(e) Date: Mar. 14, 1980

[87] PCT Pub. No.: WO80/00229
PCT Pub. Date: Feb. 21, 1980

[30] Foreign Application Priority Data

Jul. 21, 1978 [SE] Sweden .............................. 7808042

[51] Int. Cl.³ .......................................... B23K 11/10
[52] U.S. Cl. .................................. 219/86.31; 219/86.1
[58] Field of Search ............... 219/86.31, 86.1, 86.21; 174/110 F

[56] References Cited

U.S. PATENT DOCUMENTS

| 1,362,962 | 12/1920 | Redfield et al. | |
| 2,082,904 | 6/1937 | Podany | |
| 2,205,824 | 6/1940 | Shallish | |
| 2,241,687 | 5/1941 | Warnke | 219/86.31 |
| 2,371,185 | 3/1945 | Purat | 219/86.31 |
| 3,021,417 | 2/1962 | Holberstadt | |
| 4,208,566 | 6/1980 | Eghammer | 219/86.31 |

FOREIGN PATENT DOCUMENTS

| 729285 | 3/1966 | Canada | 219/86.31 |
| 603268 | 11/1931 | Fed. Rep. of Germany | |
| 276276 | 7/1969 | U.S.S.R. | 219/86.31 |

OTHER PUBLICATIONS

Bolstad Backgroun on Epoxy Foams in Electronic Design, 4/57, pp. 28, 29 and 30.
Swedish Book; *Perstropsboken*, "Plastteknisk Handbook; Andra Utgavan, pp. 328–342.

*Primary Examiner*—Elliot A. Goldberg
*Attorney, Agent, or Firm*—Young & Thompson

[57] ABSTRACT

A welding gun for electrical resistance welding has an electrode holder arm (1,2,3) made as a shell construction. The current supply to the stationary electrode (5) as well as the coolant supply to and returning from the electrode is effected with the aid of two copper tubes (14) which run parallel to each other inside the arm. The interior cavity of the arm is filled with foamed plastics (20).

3 Claims, 2 Drawing Figures

U.S. Patent
Oct. 26, 1982
4,356,373
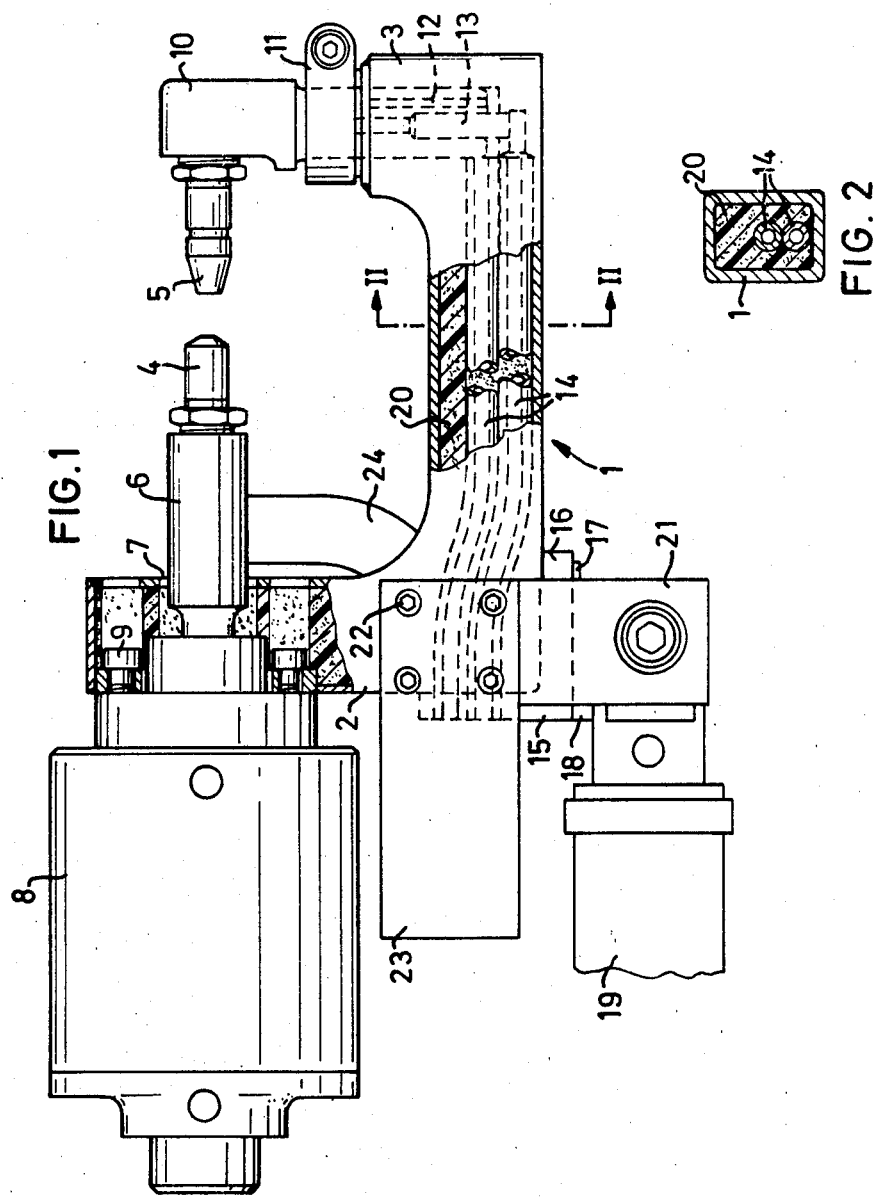

ELECTRICAL RESISTANCE WELDING APPARATUS

The present invention relates to an electrical resistance welding apparatus.

A resistance welding apparatus of this type is known by British Patent Specification No. 417,367, for example, which reveals a welding gun of C-type, the yoke of which is made of a hollow shell construction for the purpose of reducing the weight of the gun. It is extremely important that the weight of a portable welding device by kept low. The purpose of the present invention is to further reduce the weight of a welding apparatus of the type just mentioned, without reducing the other performance characteristics of the apparatus such as sturdy construction and slender design, so as to provide good access.

According to the invention, this is achieved with an electrical resistance welding apparatus which has the characteristics hereinafter set forth. By virtue of the fact that the coolant tubes are used for supplying current to the electrode, no separate conducting member or bridge is required. And due to the fact that two tubes conduct coolant to the electrode as well as returning it from the same, this saves the weight of the water volume in the interior of the yoke or arm.

According to an advantageous further development of the invention, the inner cavity of the yoke or arm is filled between its walls and the tubes with a light, sound-damping, reinforcing material, suitably foamed plastics. This filling can have multiple functions. Firstly, it can dampen the clanking or clattering noises usually accompanying work with welding machines with hollow yokes. Under certain unfavourable conditions, resonating sound phenomena can also occur during operation. Secondly, the filling reinforces the current and coolant tubes so that their joints or junctions are not subjected to such great stresses as a result of vibrations caused by electrical attractive forces. Thirdly, the filling reinforces the entire yoke so that it is more sturdy.

An embodiment of the invention is described in more detail below with reference to the accompanying drawing, in which FIG. 1 shows from the side an electrical welding gun of C-type and FIG. 2 shows a section along the line II—II in FIG. 1.

The welding gun shown in FIG. 1 has a C-shaped yoke 1 and two jaws 2 and 3, respectively, each of which carries an electrode 4 and 5, respectively. Electrode 4 is the movable electrode and is mounted in a holder 6, which protrudes through an opening 7 in the yoke jaw 2. The end of the holder 6 facing away from the electrode 4 is movably guided in a pneumatically operated cylinder 8, which is fixed to the jaw 2 by means of screws 9.

Electrode 5 is stationary and is mounted in a holder 10, which via a clamp ring 11 is immovably connected to the yoke jaw 3.

The two electrodes 4 and 5 are liquid cooled, and for this purpose they are made with interior coolant ducts in a manner which is known per se. The coolant ducts of electrode 5 communicate with coolant ducts 12,13 in the electrode holder 10. These ducts at the lower end of the holder at the transition between the jaw 3 and the back of the yoke 1 are each joined to one of two copper tubes 14. The yoke 1 is made as a hollow shell construction of welded sheet metal. The tubes 14 extend through the hollow interior of the yoke back parallel to each other until reaching the wall of yoke jaw 2 farthest away from the electrode 5. The tubes 14 extend through this wall and are soldered securely to a connection plate 15 lying outside the wall. Coolant can be supplied thereto by means of hoses (not shown). The plate 15 is L-shaped and is screwed securely with its lower horizontal leg 16 to the underside of the yoke 1 with screws 17. The connection plate 15 also has a leg 18, to which one pole of a two-conductor current supply cable 19 is connected. With this arrangement, the current supply to the electrode 5 will flow from the cable 19 through the plate leg 18, the connecting plate 15, the two tubes 14 and the electrode holder 10. Thus the coolant tubes 14 in the interior of the yoke 1 have the double function of being current and coolant conduits.

The inside of the yoke 1 is filled with foamed plastics 20, which fills out the spaces between the yoke walls and the tubes 14 and also fills the interiors of the jaws 2 and 3 except the opening 7 for the movable electrode and the openings for the mounting screws 9 of the cylinder 8. The foamed plastics 20 can be polyurethane for example, which is put into the yoke in liquid form and is allowed to foam in place. For this purpose, the yoke 1 is provided with injection and venting openings (not shown). The foamed plastics 20 acts to hold the two copper tubes 14 still during operation. Since the copper tubes 14 serve as current supply lines to the stationary electrode 5, they are subjected to strong electrical attractive forces at every current pulse. The foamed plastics 20 is rigid and prevents the current pulses from creating vibrations which could break the connection of the tubes 14 to the electrode holder 10 or the connection plate 15. Furthermore, the foamed plastics prevents the clattering resonating noise which can arise when working with a welding gun with an empty shell construction. The foamed plastics 20 also prevents the clanking when the yoke strikes other objects during work. Finally, the foamed plastics reinforces the entire shell construction.

Current is supplied to the movable electrode 4 from the other pole of the current supply cable 19 via a current supply bar 21, which extends upwards from the current supply cable 19. Outside the jaw 2 and the current supply bar 21, one end of a U-shaped, flexible, laminated conductor 23 is screwed on securely with screws 22. The laminated conductor 23 consists of essentially parallel copper strips which extend backwards from the jaw 2, go around the same and again forward to a guide on the side of the jaw 2 which is not visible in FIG. 1. This unseen side of the conductor 23 is joined to a bent arm 24, which is in turn joined to the movable electrode holder 6. In the arm 24 there are also ducts for supplying and removing coolant to and from the electrode 4.

The invention is not limited to what is described above and the example shown in the drawing. Alternatively, the welding apparatus can be made as a so-called plier-type gun with long straight jaws which are connected to each other via a joint. The coolant tubes 14 have been described as running parallel to each other. Alternatively, concentric tubes can be used, suitably with interior supporting walls.

We claim:

1. In electrical resistance welding apparatus comprising an electrode holder arm (1,2,3) which at its free end (3) carries a liquid-cooled electrode (5) and at a distance from the same has connections (15) for current supply and coolant, said arm being made as a hollow shell construction and current as well as coolant supply to the electrode (5) being effected through the arm (1); the improvement in which in the interior of the arm (1), two tubes (14) of a material with good electrical conductivity extend from the current and coolant connections (15) to a holder means (10) for the electrode (5), said tubes (14) conducting current to, as well as coolant to and from, the electrode (5), and a rigid sound-damping material means in the interior cavity of the arm (1) between its walls and the tubes (14).

2. Apparatus according to claim 1, in which said rigid sound-damping material means is a light, reinforcing material which fills the interior cavity of the arm (1) between its walls and the tubes (14).

3. Apparatus according to claim 2, in which said rigid sound-damping material means is a foamed plastic.

* * * * *